Figure 1:
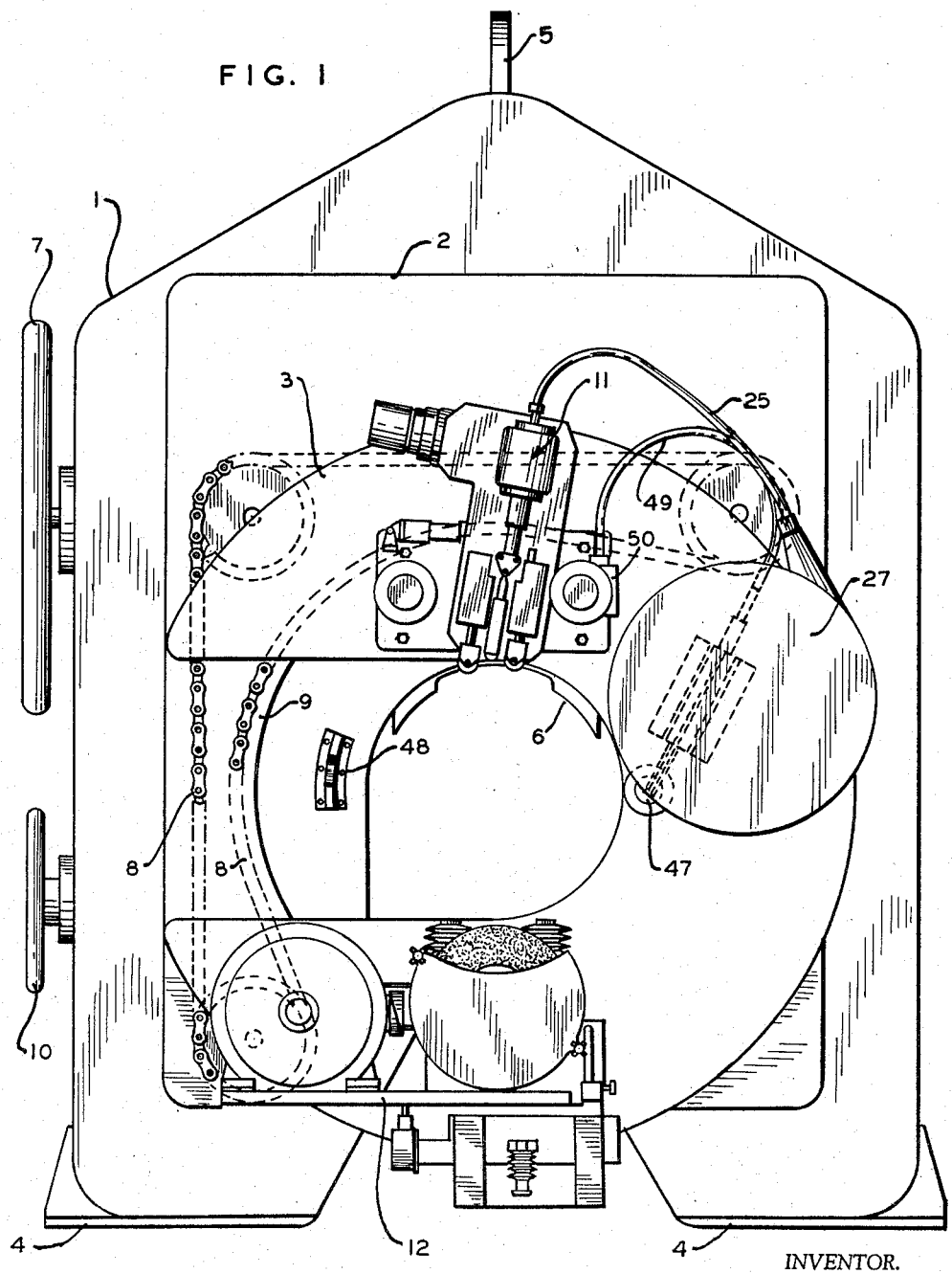

INVENTOR.
ARTHUR E. DAWSON
BY
ATTORNEY

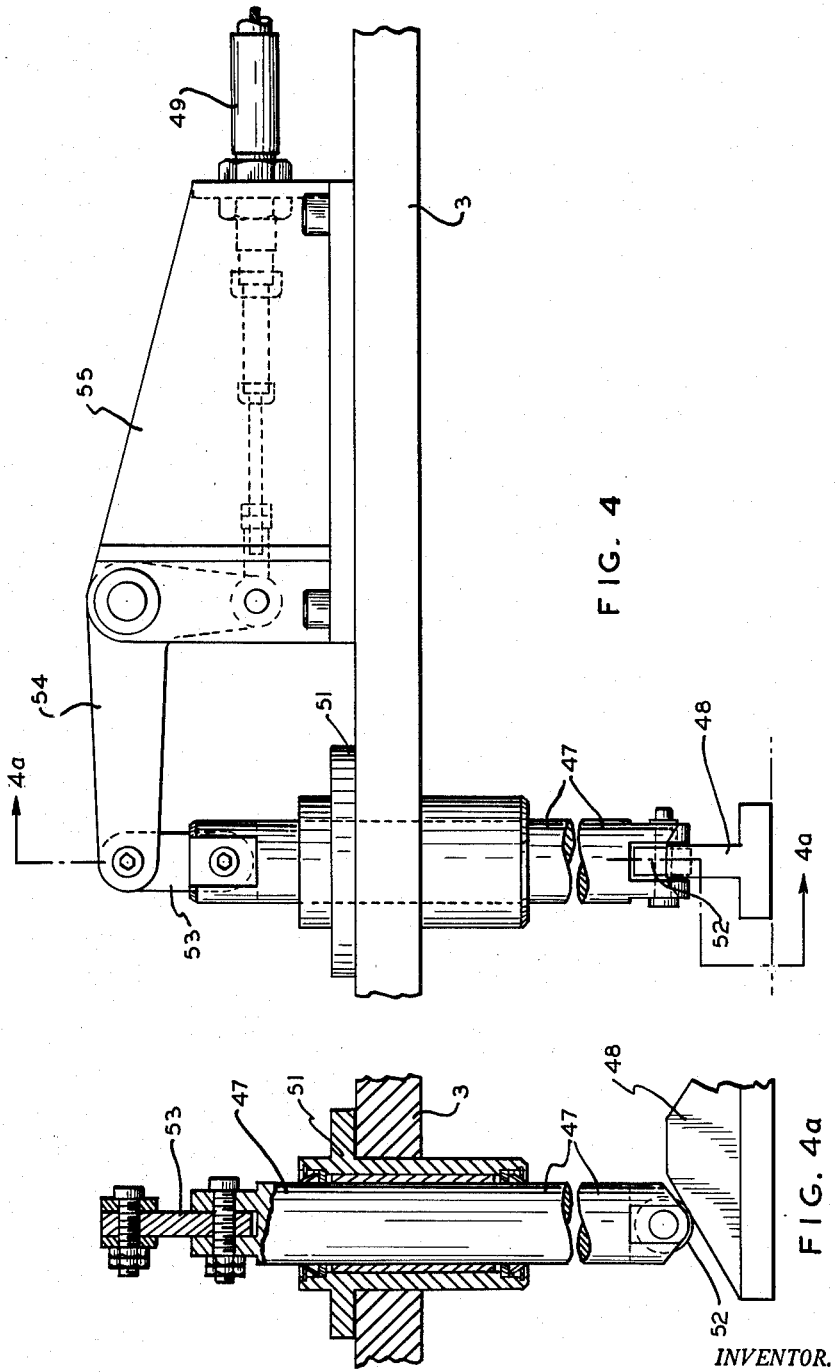

United States Patent Office 3,131,283
Patented Apr. 28, 1964

3,131,283
SEAM FOLLOWER HOLDING MEANS
Arthur E. Dawson, Meyersville R.D., Gillette, N.J., assignor to Air Reduction Company, Incorporated, New York, N.Y., a corporation of New York
Filed Dec. 28, 1961, Ser. No. 162,849
9 Claims. (Cl. 219—60)

My invention relates to means for holding a tool in the position of alignment with a seam last determined by a seam-follower means located in advance of the tool when the seam-follower means becomes ineffective by passing beyond the end of the seam.

More specifically my invention relates to seam-follower means located in advance of a tool for aligning its travel along a seam which deviates laterally from the position to which the tool is normally biased for travel lengthwise of the seam and to means for holding the tool in the position of alignment with the seam last determined by said seam-following means when it becomes inoperative by passing beyond the end of the seam and the tool would otherwise return to its biased position of travel.

In arc welding where the tool is a welding device, it is common practice to guide that device along the seam to be welded by some means that will follow the seam in advance of that device. In such arrangements when the seam-follower leaves the seam at the end thereof, alignment control of the welding device with the seam is lost and the weld may not be centered on the seam at the end thereof. This may result in an imperfect weld which for certain fabrications is intolerable.

Thus for example in accordance with one method of welding pipe sections into a pipe line, a carefully controlled gap is formed between the pipe ends which is subsequently filled with weld metal by feeding a consumable electrode into the gap under conditions causing the weld metal to flow under the arcing terminal of the electrode and behind the arc to produce a weld having consistent root fusion and a small weld reinforcement with the pipe ends. The apparatus comprises a cutting-wheel mechanism and a welding head mounted for rotation about the longitudinal axis of the pipe assembly and means for selectively operating the cutting-wheel mechanism to form the gap and the welding head to fill the gap with weld metal. Although the cutting-wheel mechanism and the welding head are mounted on a propelling means for movement along the same path of travel, it has been found that the cutting wheel, normally a thin abrading disc, has sufficient flexibility to form a gap having a lateral deviation relative to the path of travel of its propelling means. To compensate for this the welding head is mounted on the propelling means for movement laterally of the gap by means riding in the gap so that the arcing terminal of the electrode fed thereby is centered in the gap prepared by the cutting wheel. This seam- or gap-follower means is located in advance of the welding head and the electrode fed thereby and consequently rides up out of the gap at the end thereof so that alignment control is lost at the end of the gap. Since the welding head is normally biased to a predetermined position to travel lengthwise of the seam gap, it will return to this position if displaced therefrom when the seam follower disengages the seam gap at the end thereof. This may result in an imperfect weld between the pipe ends which nullifies the advantages to be obtained by an automatic pipe welder. Obviously the above described malfunctioning of the machine may occur with any form of seam follower other than that just considered.

It is an object of my invention to provide means including a seam follower located in advance of a tool for directing the tool, such as a welding device, along the end of a seam with the alignment previously determined for it by said seam follower before it becomes inoperative by passing beyond the end of the seam. By thus extending the guiding action on the tool previously determined by the seam follower, the last inch or more of the seam will be satisfactorily passed along by the tool irrespective of the total amount of lateral deviation that the seam has from the path of travel normally imparted to the tool by its propelling means.

It is a further object of my invention to provide means for holding a seam follower which aligns a welding head with the seam to be welded in that position on its propelling means last determined by the seam follower when it becomes ineffective to guide the welding devices along the seam by passing beyond the end thereof.

It is also an object of my invention to operate the above described means in response to the travel of the propelling means to a position where the seam follower loses control by passing beyond the end of the seam by which it is guided.

It is another object of my invention to provide improved guide means for supporting the welding head on its propelling means for lateral movement relative to the gap between separate members in response to a seam follower which engages the gap and is guided thereby, and for locking the welding head on its guide means for travel along said groove to the end thereof when in that position thereon which is determined by said seam follower when it leaves said gap at the end thereof.

Other objects of my invention will become apparent from the following description of one embodiment thereof.

In accordance with my invention as applied to a pipe welding machine, means are provided for propelling a welding device lengthwise of the circumferential groove between the ends of adjoining pipe sections which are to be united by said welding device. Guide means support the welding device on its propelling means for movement crosswise of the groove between the pipe ends and means are provided for biasing the welding device to a predetermined position on its guide means. A groove-following device, which has an element riding in the groove between the pipe ends in advance of the welding device, acts on the support for the welding device to move it on its guide means from its biased position thereof into alignment with the groove in response to lateral deviations of the groove from the path of travel imparted to the welding device by its propelling means. Means responsive to the movement of the propelling means to a position in its travel when the groove-engaging means of the groove-following device disengages the groove at the end thereof is provided for locking the welding device on its guide means for travel along the groove to the end thereof in the position thereof last determined by the groove-following device and for thereafter releasing the welding device for movement on its guide means to its biased position thereon.

A more complete description of this embodiment of my invention will now be described with reference to the illustration thereof shown in the accompanying drawings.

Figure 2:
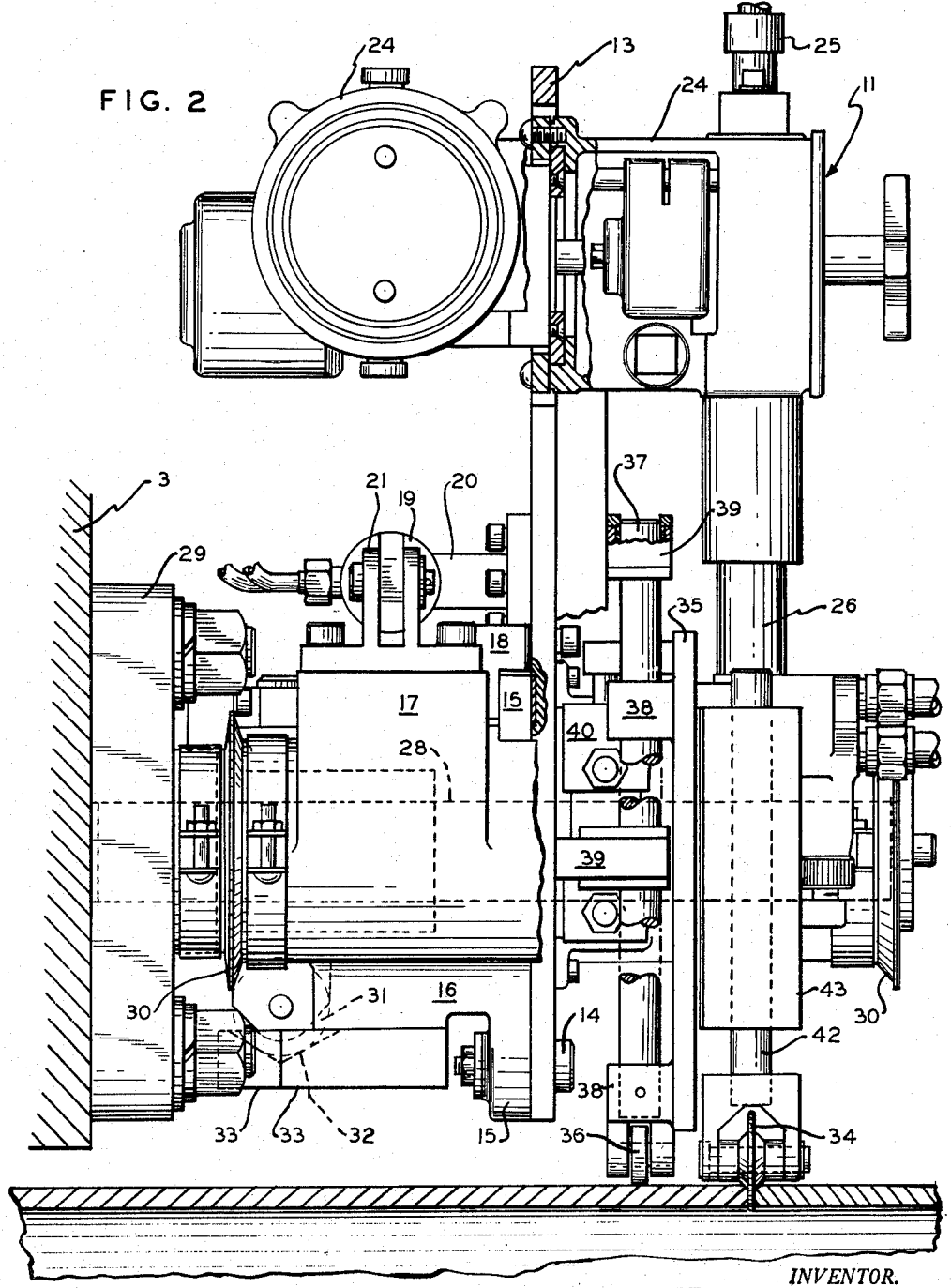
Figure 3:
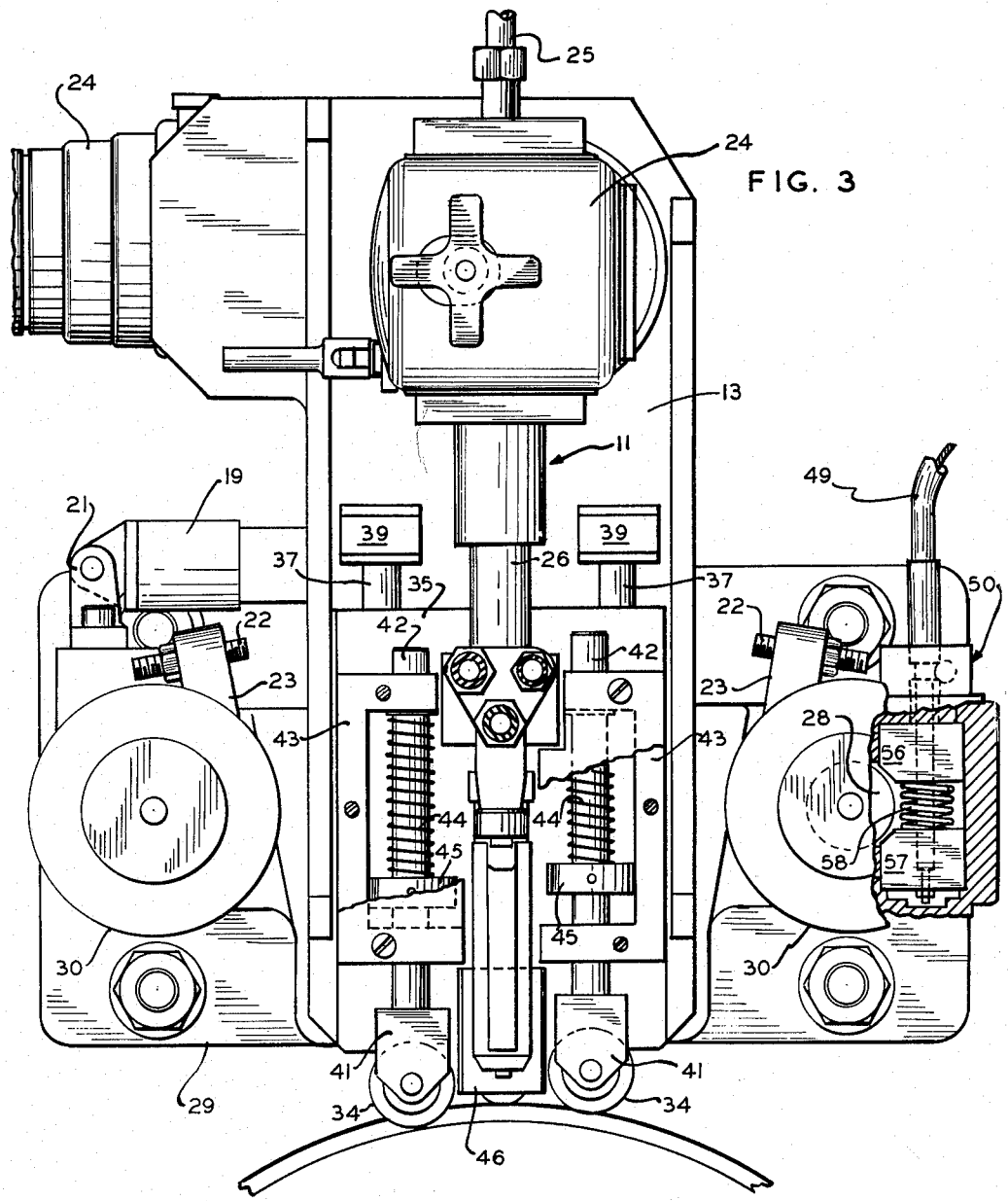

In the drawings:

FIG. 1 is a front view of a pipe welder embodying my invention,

FIG. 2 is a lefthand side view of a part of this pipe welder showing the welding head thereof, the guides by which it is supported on its propelling means, and its seam-follower means for aligning it on its guides with the seam to be welded, FIG. 3 is a front view of the apparatus shown in FIG 2, FIG. 4 is a view of the mechanism for operating the brake shown in FIGS. 1 and 3 by which the welding head support is locked in the position on its guides last determined by the seam following means at the time it becomes inoperative by disengaging the seam, and FIG. 4a is a cross-sectional view taken along the line 4a—4a of FIGURE 4.

The pipe welder, as shown by reference to FIG. 1, comprises a hollow box-like frame 1 having at one end thereof a support plate 2 for a face plate 3 all of which, including the other end of frame 1, are slotted so that the assembly will straddle a pipe when the slot in face plate 3 is in correspondence with the slots in the other members. The frame 1 is provided with feet 4 located on opposite sides of the slots therein and on which the machine may be supported on the ground or a floor surface. A lifting lug 5 is provided at the top of the sloping surfaces forming the top of frame 1, so that the machine may be bodily moved in a vertical direction to disengage it from a pipe section or pipe line when the slotted members of the machine are in alignment.

Within the frame of the welder are hourglass-shaped rollers 6 spaced lengthwise thereof and on which the welder may be supported on a pipe section extending therethrough. The surface contour of these rollers corresponds in curvature with the curvature of the pipe section on which the machine may be supported. These rollers are power-driven by an electric motor, also enclosed in the machine frame, so that when the welder is supported on a pipe section it may be self propelled along the same to a desired welding position at the joint between two pipe sections that are to be welded together in the formation of a pipe line.

The machine may be clamped in a welding position on a pipe section by operating a hand wheel 7 which brings two clamping members against the bottom surface of the pipe section opposite that portion thereof which is intermediate the rollers 6 which are spaced lengthwise of this pipe section. This hand wheel is large in size and proportioned to have considerable fly-wheel effect so that in spinning it to operate the clamp, the momentum thereof adds to the force applied by it in clamping the welder to the pipe section.

Face plate 3 is mounted on support plate 2 of the welder for rotation about the longitudinal axis of the pipe section clamped in the slotted passage extending lengthwise of the welder. Face plate 3 has attached to its back surface a slotted (i.e., circumferentially interrupted) sprocket which corresponds therewith in center and in angular extent and by which it is rotated by lengthwise movement of a chain 8 which is in engagement therewith.

This drive chain 8 is of double width and also passes over a drive sprocket and three idling sprockets located on support plate 2 so that it does not encircle the pipe assembly at the open end of the slot in plate 2 or the open (i.e., missing) portion of the sprocket attached to plate 3. One width of the chain has its periphery in driving engagement with a segment of the faceplate drive sprocket over a portion of its periphery which is greater in extent than the open portion thereof, and a track 9 operative when the chain is opposite the open (i.e., missing) portion of the face-plate drive sprocket is provided for supporting the periphery of the other width of the chain in a circular arc configuration concentric with and at an equal radius with the face-plate drive sprocket segment so that the chain as a whole is supported by this track whenever the driving length of the chain is opposite that open portion. A detailed description of this chain drive is given in United States Letters Patent 2,979,598, John Laslo, patented April 11, 1961. By thus preventing sagging of the drive chain when it is passing over the open portion of the face-plate drive sprocket segment, a uniform rotation is imparted to it and to the face-plate 3 driven thereby, assuming of course that the chain is traveling at a uniform speed.

The drive sprocket for chain 8 is rotated by a motor which is located within frame 1 of the machine, and the plate 2 on which face plate 3 is supported is adjustable lengthwise of frame 1 of the welder and of the pipe section therein by a mechanism operated by a hand wheel 10 so that the welding head 11 and cutting wheel mechanism 12 mounted on face plate 3 may be positioned over the joint between the ends of adjoining pipe sections which are to be united with one another by welding. The pipe ends are clamped in position relative to one another by an internal mandrel clamp prior to the welding operation which is performed by the welder being described.

In practicing the above-referred-to method of pipe welding, the cutting wheel is employed to form a substantially uniform narrow gap between the adjoining ends of pipe sections which have been brought into closer proximity than this desired gap width and when this sizing operation has been completed the arc welding head deposits weld metal from a consumable electrode into the gap to form a weld uniting the pipe ends. As pointed out above, it has been found that when practicing this method of welding the flexibility of the cutting wheel, which in normal practice is a thin abrading disc, causes the gap formed thereby to have a lateral deviation relative to the path of travel imparted thereto by rotation of face plate 3 which imparts the same path of travel to the welding head with the result that the electrode fed thereby may not be centered in the gap prepared by the cutting wheel. To compensate for this deviation of the gap from the path of travel imparted to the welding head, a seam-gap follower is employed to direct the welding head along the gap, and in accordance with my invention means are provided to clamp the welding head in that position of alignment with the seam-gap last determined by the seam-following means when it becomes inoperative by passing beyond the end of the seam gap. By thus extending the guiding action on the welding head, the end of the seam will be satisfactorily passed along to form a weld of desired quality irrespective of the total amount of lateral deviation that the prepared seam gap has from the path of travel imparted to the welding head. One embodiment of my invention which has been used in the pipe welder of FIG. 1 of the drawings will now be described by reference thereto and to the remaining figures of the drawings.

The welding head 11 is for the most part supported on the front side of a mounting plate 13 whose bottom portion is pivoted at 14 to the web portion 15 of a carrier member 16. This carrier member has two hollow cylindrical portions 17 which are respectively located on opposite sides of its web portion 15 and which extend in opposite directions in front of and behind it. The vertically central portion of plate 13 is held to web 15 of carrier member 16 by a slide latch 18 which is attached to the back surface of the plate and engages the upper back edge of web 15 which has an arcuate periphery over which the latch travels when plate 13 is tilted about its pivot support 14.

Mounting plate 13 may be tilted about its pivotal support on carrier member 16 by a hydraulic piston-and-cylinder mechanism 19 having its relatively movable portions respectively attached to a boss 20 on the back of plate 13 and to a bracket 21 mounted on the rear portion of one of the cylindrical portions 17 of carrier member 16. The limits of the tilt imparted to mounting plate 13 are determined by the adjustment of screws 22 which are supported in lugs 23 forming part of the carrier member 16 and which are abutted against by the flanged side edge portions of mounting plate 13 when it is tilted by operation of mechanism 19.

The upper portion 24 of the welding head 11 comprises a motor drive for feed rolls enclosed therein and positioned to engage a consumable electrode fed through a casing 25 and suitable guides in the welding head to the lower barrel portion 26 thereof. As shown in FIG. 1 the casing 25 extends from an enclosed holder 27 which is supported on face plate 3 and supports a reel of electrode wire. It is to be noted that part of the electrode-feed motor drive extends through an opening in the upper portion of mounting plate 13.

The two hollow cylindrical portions 17 of carrier member 16 each contain in the end portions thereof bearings which engage and slide lengthwise of shafts 28 whose inner or rear ends are attached to and supported by a base plate 29 which is bolted at its four corners to face plate 3 for movement therewith. The ends of these shafts which extend beyond the ends of the cylindrical portions of carrier member 16 are protected by flexible bellows 30, the ends of which are respectively attached to the carrier 16 and the ends of the shafts 28.

The carrier member 16 and the welding head 11 supported thereon by mounting plate 13 are biased to a predetermined position on slide shafts 28 by a roller 31 which is forced into yielding engagement with a V-notch cam groove 32 formed in members 33 attached to a depending part of the carrier member 16 which is located intermediate the cylindrical portions 17 thereof. Roller 31 is rotatably supported in a yoke attached to the end of a shaft which is supported in a holder attached to the base plate 29 and spring biased to bring roller 31 into engagement with the bottom of the cam groove 32 forward in members 33.

The carrier member 16 and the welding head 11 supported thereon are moved lengthwise of slide shafts 28 from their biased positions thereof by guide rolls 34 acting through a guide-roll mounting plate 35 which is coupled to mounting plate 13. The guide rolls are spring biased into the seam or groove formed between the pipe ends when their mounting plate 35 is constrained to ride on the peripheral surface of one of the pipe end portions through a support roller 36 which engages this surface of that pipe portion.

Guide-roll mounting plate 35 is coupled to mounting plate 13 for movement lengthwise thereof. This coupling comprises two shafts 37 each of which is held in a pair of lugs 38 welded to the back surface of the mounting plate 35 adjacent a side edge thereof and each of which slides in two bearings 39 attached to the front surface of mounting plate 13. A hydraulic piston and cylinder mechanism 40 located between the shafts 37 and having its relatively movable members respectively attached to the welding-head mounting plate 13 and the guide-roll mounting plate 35 is provided for forcing support roller 36 for plate 35 into engagement with the peripheral end surface of the pipe section held by the machine to space portion 26 of the welding head at the desired distance from the welding seam or groove. It also serves to separate the guide-roll mounting plate and its guide rolls from the pipe line when moving the welder from one welding position to another. The guide rolls 34 are supported in yokes 41 attached to the ends of shafts 42 which are spring biased toward the seam gap by springs 44 reacting against brackets 43 and blocks 45 attached to these shafts.

The barrel portion 26 of the welding head is mounted on the face of the guide-roll mounting plate 35 between the guide-roll support means just described. This portion of the welding head makes a telescopic fit with the upper portion of the head to accommodate the movement of the guide-roll mounting plate 35 relative to welding-head mounting plate 13 to which it is coupled. This barrel portion of the welding head directs the welding electrode into the seam gap, supplies welding current thereto and in the preferred embodiment supplies a shielding gas to the welding zone. A shield 46 is placed about the lower end of barrel portion 26 of the welding head to protect the guide rolls 34 from weld spatter and to maintain the gas shield about the welding zone against the disruptive action of air currents which are encountered during welding, especially when operating in the open air under field conditions.

From the description thus far given it is apparent that that one of the guide rolls 34 which is riding in the seam gap ahead of the welding head will align it with the seam gap in its travel lengthwise thereof by displacing the carrier member 16 on slide shafts 28 which constitute guide means on the traversing means 3 for supporting the welding head for movement crosswise of the seam groove. Usually the welding head will be tilted to point in its direction of rotation about the seam gap to direct the welding electrode toward the progress of welding. Thus the welding head will feed its electrode into the seam gap irrespective of lateral deviations of the seam groove from the path of travel imparted to the welding head by rotation of face plate 3 on which the welding head is supported. When however the guide roll rides up out of the seam gap at the end thereof this guide control of the welding head is lost and, if its carrier member 16 has been moved from the position to which it has been biased by spring-pressed roller 31 riding in cam groove 32, the welding operation will be arrested by the electrode engaging a wall of the seam gap and extinguishing the welding arc or if this does not occur at least the uniformity of welding conditions will be disrupted resulting in an unsatisfactory weld at the end of the seam gap.

To prohibit this disruption of the desired welding conditions which might occur at the end of a seam gap along which the welding head has been guided by a seam-following device, I provide means for holding the welding head in its travel to the end of the seam in the position of alignment with the seam last determined by said seam-following device when it passes beyond the end of the seam gap. In the illustrated embodiment of my invention I employ for this purpose cam-operated means having cooperating elements respectively located on support plate 2 and face plate 3 of the welder for actuating a clamping means on carrier member 16 to engage one of its guide shafts 28 and hold it and thereby the welding head thereon in the position of alignment it has with the seam gap when last determined by an operative guide roll 34 at the time it disengages the seam gap at the end thereof.

The seam-guide clamping mechanism and its actuating mechanism is shown in FIGS. 1, 2 and 4. As shown in FIG. 1 a plunger 47 which extends through face plate 3 to be engaged by a cam 48 on support plate 2 is employed to actuate, through a flexible cable 49, the members of a brake 50 located in one of the cylindrical portions 17 of the carrier member 16 and to bring them into clamping engagement with one of the guide shafts 28 for member 16. The cam 48 and plunger 47 of this seam-guide clamp are located relative to one another on support plate 2 and face plate 3 to secure actuation of the clamp at the time in the relative traverse of these members when an operative guide roll 34 of the seam guide disengages the seam groove at the end thereof.

As shown in FIGS. 4 and 4a, plunger 47 of the seam-guide clamp is supported in and guided by a sleeve 51 which extends through face plate 3. The inner or rear end of plunger 47 is provided with a cam-engaging roll 52 and its other end is connected through a link 53 with one end of a bell crank 54 whose other end is connected to one end of the flexible cable 49. This bell crank is pivotally supported in a bracket 55 which is attached to the front of face plate 3 and which is provided with a flange to which one end of the flexible-cable sleeve is attached. The other end of this flexible cable is attached to a surface portion of part 17 of carrier member 16 in which the brake per se 50 is located. As shown in FIG. 3 this brake comprises plugs 56 and 57 which are held apart by a spring 58 and out of engagement with one of the guide shafts 28 for carrier member 16. Motion transmitted through flexible cable 49 acts on these blocks to bring them into engagement with shaft 28 and thus to operate brake 50 into clamping engagement with shaft 28 to hold member 16 on which the welding head is supported fixed in that position relative to the seam gap which it occupies as of the time the operative one of the guide rolls 34 of the seam follower rides out of the seam gap. The face of cam 48 is of sufficient length to hold this brake 50 in clamping engagement with guide shaft 28 for member 16 until the welding head has traveled to the end of the seam gap between the pipe ends.

I have described my invention as applied to one form of pipe welding apparatus in which frames are rotated relatively to one another about the longitudinal axes of the ends of pipe sections held relative thereto in substantial alignment and abutment with one another and in which means on one of the frames is provided for supporting a gap-cutting means and a consumable-electrode arc-welding means for sequential operation on the joint between the pipe end sections to form a carefully controlled gap between said pipe ends which is subsequently filled with weld metal by said arc-welding means by feeding a consumable electrode into this prepared gap. In accordance with my invention, means have been provided in this pipe-welding apparatus for mechanically engaging this prepared gap in advance of the arc-welding means for aligning the consumable electrode fed thereby with the center portion of the gap and cam-operated means having cooperating elements respectively supported on the relatively rotated frames have also been provided for actuating a clamp which holds the arc-welding means on its supporting frame in its position of alignment with the prepared seam-gap to the end thereof when said seam-gap-engaging means disengages the gap at the end thereof.

It is, of course, apparent that my invention is not limited to the specific pipe-welding apparatus above described but has general application to means which hold any tool in its travel to the end of a seam in the position of alignment with the seam-last determined by a seam-aligning means located in advance of the tool when the seam-aligning means passes beyond the end of the seam. Thus seam-follower means other than the mechanical arrangement embodying a guide roll which engages the seam may be employed for directing a tool or other device along the seam and means other than that above described may be employed for holding the tool in its travel to the end of the seam after such seam-follower means passes beyond the end of the seam.

Many modifications and adaptations of my invention will, in view of the above description of one embodiment thereof, readily occur to those skilled in the art. It is consequently my intention to cover by the appended claims all such changes and modifications of my invention above described which do not constitute departures from the spirit and scope thereof.

I claim:

1. Apparatus comprising means for propelling a tool lengthwise of a seam, seam-follower means propelled in advance of said tool, coupling means between said tool and said seam-follower means for placing the position of said tool laterally of said seam under the control of said seam-follower means, and means comprised in said coupling means for holding said tool in its travel to the end of said seam in the lateral position last determined by said seam-follower means at the end of said seam.

2. Apparatus comprising means for propelling a tool lengthwise of a seam, means engaging said seam in advance of said tool for aligning said tool laterally of said seam, and brake means for holding said tool in its travel to the end of said seam in the position of lateral alignment last determined by said aligning means prior to its disengagement of said seam at the end thereof.

3. Apparatus comprising means for propelling a welding device lengthwise of a seam between members to be joined thereby, means engaging said seam in advance of said welding device, coupling means between said welding device and said seam-engaging means for placing the position of said welding device laterally of said seam under the control of said seam-engaging means, and means comprised in said coupling means for holding said welding device in its travel to the end of said seam in the lateral position last determined by said seam-engaging means prior to its disengagement of said seam at the end thereof.

4. Apparatus comprising means for propelling a welding device lengthwise of a seam between members to be joined thereby, means engaging said seam in advance of said welding device for aligning said welding device laterally of said seam in its travel lengthwise thereof, and means operated by said propelling means and rendered effective when said seam-engaging means disengages said seam at the end thereof for holding said welding device in its travel to the end of said seam in the position of lateral alignment last determined by said seam-engaging means.

5. Apparatus comprising means for propelling a welding device lengthwise of a groove between members to be joined by said welding device, guide means supporting said welding device on said propelling means for movement crosswise of said groove, means for biasing said welding device to a predetermined position on said guiding means, a groove-following device having an element engaging said groove in advance of said welding device and acting on said welding device to move it on said guide means from its biased position thereon into alignment with said groove in response to lateral deviations of said groove from the path of travel imparted to said welding device by its said propelling means, and means responsive to the movement of said propelling means to a position in its travel where said groove-engaging element of said groove-following device disengages said groove at the end thereof for locking said welding device on said guide means for travel along said groove to the end thereof in the position thereon last determined by said groove-following device.

6. Apparatus comprising means for propelling a welding device lengthwise of a groove between members to be joined by said welding device, guide means supporting said welding device on said propelling means for movement crosswise of said groove, means for biasing said welding device to a pre-determined position on said guiding means, a groove-following device which has an element riding in said groove in advance of said welding device and which acts on said welding device to move it on said guide means from its biased position thereon into alignment with said groove in response to lateral deviations of said groove from the path of travel imparted to said welding device by its said propelling means, and means responsive to the movement of said propelling means to a position in its travel where said groove-engaging element of said groove-following device disengages said groove at the end thereof for locking said welding device on said guide means for travel along said groove to the end thereof in the position thereon last determined by said groove-following device and for thereafter releasing said welding device for movement on said guide means to its biased position thereon.

7. Pipe-welding apparatus comprising gap-cutting means and a consumable-electrode arc-welding means and means for rotating both said means about the longitudinal axis of the end portions of pipes held in substantial alignment and abutment with one another, means for operating said gap-cutting means and said arc-welding means to form a prepared gap between said pipe ends and thereafter to fill said prepared gap with weld metal, means engaging said prepared gap in advance of said arc-welding means, coupling means between said arc-welding means and said gap-engaging means for placing the position of said arc-welding means laterally of said gap under the control of said gap-engaging means, and means comprised in said coupling means for holding said arc-welding means in the lateral position determined by said gap-engaging means at the end of said gap.

8. Pipe-welding apparatus comprising frames supported for rotation relative to one another about the longitudinal axis of the end portions of pipes held in substantial alignment and abutment with one another, means on one of said frames for supporting a gap cutting means and a consumable-electrode arc-welding means for sequential operation on the joint between the ends of said pipe sections to form a prepared gap between said pipe ends and thereafter to fill said gap with weld metal, means engaging said prepared gap in advance of said arc-welding means for moving said arc-welding means laterally relative to said one frame to align it with said gap, and cam-operated means including actuating elements respectively supported on said relatively rotatable frames for clamping said arc-welding means on said one frame in the position of alignment with said prepared gap which it occupies when said gap-engaging means disengages said gap at the end thereof.

9. Apparatus comprising means for propelling a tool lengthwise of a seam, a guide along which said tool is movable laterally of said seam, means biasing said tool in one direction along said guide, means engaging said seam in advance of said tool for holding said tool, against the force of said biasing means, in a position of lateral alignment with said seam, and means rendered effective when said seam-engaging means disengages said seam at the end thereof for rendering said biasing means ineffective.

References Cited in the file of this patent
UNITED STATES PATENTS 2,013,630     Goldsborough _____ Sept. 3, 1935
2,969,454     Lucey _____ Jan. 24, 1961